(12) United States Patent
Kameda (10) Patent No.: US 11,331,963 B2
(45) Date of Patent: May 17, 2022

(54) RUN-FLAT TIRE

(71) Applicant: The Yokohama Rubber Co., LTD., Tokyo (JP)

(72) Inventor: Norifumi Kameda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 22 days.

(21) Appl. No.: 16/652,971

(22) PCT Filed: Aug. 27, 2018

(86) PCT No.: PCT/JP2018/031607
§ 371 (c)(1),
(2) Date: Apr. 1, 2020

(87) PCT Pub. No.: WO2019/069589
PCT Pub. Date: Apr. 11, 2019

(65) Prior Publication Data
US 2020/0324583 A1      Oct. 15, 2020

(30) Foreign Application Priority Data

Oct. 2, 2017   (JP) .............................. JP2017-192871

(51) Int. Cl.
*B60C 15/06*     (2006.01)
*B60C 17/00*     (2006.01)
*B60C 9/20*      (2006.01)

(52) U.S. Cl.
CPC ............ *B60C 17/0009* (2013.01); *B60C 9/20* (2013.01); *B60C 15/0603* (2013.01);
(Continued)

(58) Field of Classification Search
CPC ............ B60C 17/08; B60C 2015/0617; B60C 2015/0621; B60C 17/0009;
(Continued)

(56) References Cited

U.S. PATENT DOCUMENTS

2010/0147439 A1    6/2010   Koeune et al.
2015/0202929 A1*   7/2015   Horiuchi ................. B60C 15/06
                                                         152/517
2017/0197478 A1    7/2017   Mitarai

FOREIGN PATENT DOCUMENTS

JP      2004189106 A  *  7/2004
JP      2010-137853      6/2010
(Continued)

OTHER PUBLICATIONS

Machine Translation: JP-2004189106-A, Tanami, Yurie, (Year: 2021).*
(Continued)

*Primary Examiner* — Kendra Ly
(74) *Attorney, Agent, or Firm* — Thorpe North & Western (57) ABSTRACT

A run-flat tire includes reinforcing rubber in a sidewall, first bead filler rubber disposed toward the inside of a folded back portion of a carcass layer in a lateral direction, and second bead filler rubber disposed toward the outside of the folded back portion in the lateral direction. The reinforcing rubber has a thickness from a rim base line to a position within 38% to 68% of a tire cross-sectional height being from 90% to 100% of a maximum thickness of the reinforcing rubber. In a range from a position of a rim check line to a position being 38% of the tire cross-sectional height from the rim base line, a total thickness of the reinforcing rubber, the first bead filler rubber, and the second bead filler rubber is from 100% to 140% of the maximum thickness of the reinforcing rubber.

17 Claims, 5 Drawing Sheets

(52) U.S. Cl.
CPC .. *B60C 15/0607* (2013.01); *B60C 2009/2019* (2013.01); *B60C 2015/061* (2013.01); *B60C 2017/0054* (2013.01); *B60C 2017/0063* (2013.01); *B60C 2017/0072* (2013.01)

(58) Field of Classification Search
CPC ............ B60C 17/0018; B60C 17/0027; B60C 17/0036; B60C 17/0045; B60C 2017/0054; B60C 2017/0063; B60C 2017/0072
See application file for complete search history.

(56) References Cited

FOREIGN PATENT DOCUMENTS

| | | |
|---|---|---|
| JP | 2012-096656 | 5/2012 |
| JP | 2014-054967 | 3/2014 |
| JP | 5583393 | 9/2014 |
| JP | 2015-067256 | 4/2015 |
| JP | 2015-205594 | 11/2015 |
| JP | 5973772 | 8/2016 |
| JP | 2017-056815 | 3/2017 |
| JP | 2017-121888 | 7/2017 |
| WO | WO 2014/042035 | 3/2014 |

OTHER PUBLICATIONS

International Search Report for International Application No. PCT/JP2018/031607 dated Nov. 27, 2018, 4 pages, Japan.

\* cited by examiner

| | CONVENTIONAL EXAMPLE 1 | CONVENTIONAL EXAMPLE 2 | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|---|---|
| (MINIMUM THICKNESS OF SIDE REINFORCING RUBBER AT POSITION BEING FROM 38% TO 68% OF TIRE CROSS-SECTIONAL HEIGHT)/GBmax [%] | 75 | 95 | 75 | 75 | 95 | 95 | 95 | 95 | 95 |
| (TOTAL THICKNESS OF SIDE REINFORCING RUBBER, FIRST BEAD FILLER RUBBER, AND SECOND BEAD FILLER RUBBER IN RANGE FROM RIM CHECK LINE TO POSITION BEING 38% OF TIRE CROSS-SECTIONAL HEIGHT SH)/GBmax [%] | 90 | 150 | 90 | 90 | 150 | 120 | 120 | 120 | 120 |
| CROSS-SECTIONAL AREA OF SECOND BEAD FILLER RUBBER WITH RESPECT TO CROSS-SECTIONAL AREA OF FIRST BEAD FILLER RUBBER (+ OR −) | | | + | − | − | + | + | + | + |
| HEIGHT H1 OF FIRST BEAD FILLER RUBBER WITH RESPECT TO TIRE CROSS-SECTIONAL HEIGHT SH [%] | 40 | | 30 | 40 | 40 | 12 | 40 | 25 | 25 |
| HEIGHT H2 OF SECOND BEAD FILLER RUBBER WITH RESPECT TO TIRE CROSS-SECTIONAL HEIGHT SH [%] | | | 70 | 30 | 30 | 30 | 30 | 30 | 70 |
| LINEAR DISTANCE W BETWEEN END PORTIONS OF SECOND BEAD FILLER RUBBER WITH RESPECT TO TIRE CROSS-SECTIONAL HEIGHT SH [%] | 50 | | 40 | 20 | 20 | 20 | 20 | 20 | 65 |
| (CROSS-SECTIONAL AREA OF FIRST BEAD FILLER RUBBER + CROSS-SECTIONAL AREA OF SECOND BEAD FILLER RUBBER)/CROSS-SECTIONAL AREA OF SIDE REINFORCING RUBBER [%] | 50 | 50 | 50 | 50 | 50 | 20 | 20 | 20 | 50 |
| (THICKNESS OF FIRST BEAD FILLER RUBBER + THICKNESS OF SECOND BEAD FILLER RUBBER)/THICKNESS OF SIDE REINFORCING RUBBER [%] AT POSITION OF RIM CHECK LINE | 350 | 350 | 350 | 350 | 350 | 150 | 150 | 150 | 150 |
| WIDTH BW OF SECOND BELT/GROUND CONTACT WIDTH TW [%] | 100 | 100 | 100 | 100 | 100 | 100 | 100 | 100 | 100 |
| OVERLAPPING AMOUNT L [mm] BETWEEN FIRST BELT AND SIDE REINFORCING RUBBER | 13 | 13 | 13 | 13 | 13 | 13 | 13 | 13 | 13 |
| BELT ANGLE OF BELT LAYER [°] | 23 | 23 | 23 | 23 | 23 | 23 | 23 | 23 | 23 |
| PRESENCE OF BELT FULL COVER | YES | YES | YES | YES | YES | YES | YES | YES | YES |
| JIS-A HARDNESS AT 20°C OF SIDE REINFORCING RUBBER | 80 | 80 | 80 | 80 | 80 | 80 | 80 | 80 | 80 |
| tan δ AT 60°C OF SIDE REINFORCING RUBBER | 0.03 | 0.03 | 0.03 | 0.03 | 0.03 | 0.03 | 0.03 | 0.03 | 0.03 |
| JIS-A HARDNESS AT 20°C OF FIRST BEAD FILLER RUBBER | 80 | 80 | 80 | 80 | 80 | 80 | 80 | 80 | 80 |
| tan δ AT 60°C OF FIRST BEAD FILLER RUBBER | 0.03 | 0.03 | 0.03 | 0.03 | 0.03 | 0.03 | 0.03 | 0.03 | 0.03 |
| JIS-A HARDNESS AT 20°C OF SECOND BEAD FILLER RUBBER | | | 80 | 80 | 80 | 80 | 80 | 80 | 80 |
| tan δ AT 60°C OF SECOND BEAD FILLER RUBBER | | | 0.03 | 0.03 | 0.03 | 0.03 | 0.03 | 0.03 | 0.03 |
| RUN-FLAT DURABILITY PERFORMANCE | 100 | 105 | 95 | 101 | 107 | 108 | 107 | 110 | 109 |
| RIDE COMFORT PERFORMANCE | 100 | 95 | 95 | 97 | 92 | 104 | 100 | 103 | 102 |

FIG. 4A

| | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|
| (MINIMUM THICKNESS OF SIDE REINFORCING RUBBER AT POSITION BEING FROM 38% TO 68% OF TIRE CROSS-SECTIONAL HEIGHT)/GBmax [%] | 95 | 95 | 95 | 95 | 95 | 95 | 95 | 95 | 95 |
| (TOTAL THICKNESS OF SIDE REINFORCING RUBBER, FIRST BEAD FILLER RUBBER, AND SECOND BEAD FILLER RUBBER IN RANGE FROM RIM CHECK LINE TO POSITION BEING 38% OF TIRE CROSS-SECTIONAL HEIGHT SH)/GBmax [%] | 120 | 120 | 120 | 120 | 120 | 120 | 120 | 120 | 120 |
| CROSS-SECTIONAL AREA OF SECOND BEAD FILLER RUBBER WITH RESPECT TO CROSS-SECTIONAL AREA OF FIRST BEAD FILLER RUBBER (+ OR -) | + | + | + | + | + | + | + | + | + |
| HEIGHT H1 OF FIRST BEAD FILLER RUBBER WITH RESPECT TO TIRE CROSS-SECTIONAL HEIGHT SH [%] | 30 | 30 | 30 | 30 | 30 | 30 | 30 | 30 | 30 |
| HEIGHT H2 OF SECOND BEAD FILLER RUBBER WITH RESPECT TO TIRE CROSS-SECTIONAL HEIGHT SH [%] | 50 | 50 | 50 | 50 | 50 | 50 | 50 | 50 | 50 |
| LINEAR DISTANCE W BETWEEN END PORTIONS OF SECOND BEAD FILLER RUBBER WITH RESPECT TO TIRE CROSS-SECTIONAL HEIGHT SH [%] | 40 | 40 | 40 | 40 | 40 | 40 | 40 | 40 | 40 |
| (CROSS-SECTIONAL AREA OF FIRST BEAD FILLER RUBBER + CROSS-SECTIONAL AREA OF SECOND BEAD FILLER RUBBER)/CROSS-SECTIONAL AREA OF SIDE REINFORCING RUBBER [%] | 50 | 35 | 35 | 35 | 35 | 35 | 35 | 35 | 35 |
| (THICKNESS OF FIRST BEAD FILLER RUBBER + THICKNESS OF SECOND BEAD FILLER RUBBER)/THICKNESS OF SIDE REINFORCING RUBBER [%] AT POSITION OF RIM CHECK LINE | 350 | 310 | 250 | 250 | 250 | 250 | 250 | 250 | 250 |
| WIDTH BW OF SECOND BELT/GROUND CONTACT WIDTH TW [%] | 100 | 100 | 100 | 112 | 105 | 105 | 105 | 105 | 105 |
| OVERLAPPING AMOUNT L [mm] BETWEEN FIRST BELT AND SIDE REINFORCING RUBBER | 13 | 13 | 13 | 35 | 25 | 25 | 25 | 25 | 25 |
| BELT ANGLE OF BELT LAYER [°] | 23 | 23 | 23 | 23 | 23 | 38 | 28 | 28 | 28 |
| PRESENCE OF BELT FULL COVER | YES | YES | YES | YES | YES | YES | NO | YES | YES |
| JIS-A HARDNESS AT 20°C OF SIDE REINFORCING RUBBER | 80 | 80 | 80 | 80 | 80 | 80 | 80 | 80 | 77 |
| tan δ AT 60°C OF SIDE REINFORCING RUBBER | 0.03 | 0.03 | 0.03 | 0.03 | 0.03 | 0.03 | 0.03 | 0.03 | 0.02 |
| JIS-A HARDNESS AT 20°C OF FIRST BEAD FILLER RUBBER | 80 | 80 | 80 | 80 | 80 | 80 | 80 | 80 | 72 |
| tan δ AT 60°C OF FIRST BEAD FILLER RUBBER | 0.03 | 0.03 | 0.03 | 0.03 | 0.03 | 0.03 | 0.03 | 0.03 | 0.02 |
| JIS-A HARDNESS AT 20°C OF SECOND BEAD FILLER RUBBER | 80 | 80 | 80 | 80 | 80 | 80 | 80 | 80 | 72 |
| tan δ AT 60°C OF SECOND BEAD FILLER RUBBER | 0.03 | 0.03 | 0.03 | 0.03 | 0.03 | 0.03 | 0.03 | 0.03 | 0.02 |
| RUN-FLAT DURABILITY PERFORMANCE | 115 | 120 | 125 | 127 | 130 | 125 | 132 | 135 | 140 |
| RIDE COMFORT PERFORMANCE | 106 | 109 | 109 | 103 | 109 | 109 | 110 | 112 | 115 |

FIG. 4B

RUN-FLAT TIRE

TECHNICAL FIELD

The present technology relates to a run-flat tire.

BACKGROUND ART

A pneumatic tire is mounted on a rim, inflated with air, and mounted on a vehicle. Due to an internal air pressure, the pneumatic tire bears a load during vehicle travel. However, in a case where air inside of the pneumatic tire escapes due to a puncture or the like, it becomes difficult for the pneumatic tire to bear a load. That is, a load supported by air pressure becomes supported by a sidewall portion, and thus, the sidewall portion greatly deforms, and travel becomes difficult.

Thus, as a pneumatic tire that can travel in a state where air escapes from the pneumatic tire due to a puncture or the like, that is, that can perform so-called run-flat travel, there is known a run-flat tire provided with side reinforcing rubber inside of a sidewall portion and providing improved bending rigidity of the sidewall portion. Namely, even in a case where air inside the run-flat tire escapes and a large load acts on the sidewall portion, deformation of the sidewall portion is suppressed, and accordingly the run-flat tire can travel.

On the other hand, the run-flat tire is provided with the side reinforcing rubber, and accordingly riding comfort and rolling resistance tend to easily degrade. Additionally, during run-flat travel, the sidewall portion bears a large load, and thus it becomes important to ensure durability. Thus, in some run-flat tires of the related art including side reinforcing rubber, various methods are used to ensure these kinds of performance. For example, in a run-flat tire described in each of Japan Patent Nos. 5583393 and 5973772 and Japan Unexamined Patent Publication Nos. 2015-067256 and 2017-056815, a sidewall portion is provided with side reinforcing rubber, and a rubber member suitable for a purpose is also disposed toward the outside of a carcass turned-up portion in the tire lateral direction. Accordingly, improved ride comfort performance, reduced rolling resistance, and improved durability during run-flat travel are provided.

Here, in recent years, although a pneumatic tire for a passenger vehicle having a low aspect ratio has been widely used, a pneumatic tire having a high aspect ratio is still widely used. However, such a pneumatic tire having a high aspect ratio has a large height in the tire radial direction from a mounting portion on a rim wheel to a tread surface, and thus a sidewall portion easily deflects. In a case where a run-flat tire is used for a pneumatic tire having a high aspect ratio, a sidewall portion easily deflects also during run-flat travel. In this case, while a large load acts on the run-flat tire, the run-flat tire repeatedly deflects, and due to this, the run-flat tire tends to break. It has been very difficult to increase an aspect ratio of a run-flat tire to ensure durability during run-flat travel.

SUMMARY

The present technology has been made in view of the above-described circumstances, and the present technology provides a run-flat tire that can provide improved durability during run-flat travel.

A run-flat tire according to an embodiment of the present technology includes a tread portion, a sidewall portion disposed on each of both sides of the tread portion, a bead portion disposed toward the inside of the sidewall portion in a tire radial direction, a carcass layer extending from the tread portion through the sidewall portion to the bead portion, including an end portion folded back in the bead portion toward the outside in a tire lateral direction while the carcass layer is wound in a tire circumferential direction, an innerliner layer disposed in an inner circumferential surface of the carcass layer, a side reinforcing rubber disposed between the carcass layer and the innerliner layer in the sidewall portion, first a bead filler rubber disposed toward the inside of a folded back portion of the carcass layer in the tire lateral direction, and a second bead filler rubber disposed toward the outside of the folded back portion of the carcass layer in the tire lateral direction along the carcass layer. The side reinforcing rubber has a thickness from a reference position toward the inside of a tire cross-sectional height in the tire radial direction to a position outward within the range of 38% or more and 68% or less of the tire cross-sectional height in the tire radial direction being within the range of 90% or more and 100% or less of a maximum thickness of the side reinforcing rubber, and at least in the range from a position in the tire radial direction of a rim check line to a position being 38% of the tire cross-sectional height toward the outside from the reference position in the tire radial direction, a total thickness of the side reinforcing rubber, the first bead filler rubber, and the second bead filler rubber is within the range of 100% or more and 140% or less of the maximum thickness of the side reinforcing rubber.

In the run-flat tire, preferably in a meridian cross-section, a cross-sectional area of the first bead filler rubber is larger than a cross-sectional area of the second bead filler rubber.

In the run-flat tire, preferably, the first bead filler rubber has a height in the tire radial direction from the reference position to an outer end portion in the tire radial direction being within the range of 15% or more and 35% or less of the tire cross-sectional height, the second bead filler rubber has a height in the tire radial direction from the reference position to an outer end portion in the tire radial direction being within the range of 38% or more and 65% or less of the tire cross-sectional height, and the second bead filler rubber has a distance between an inner end portion in the tire radial direction and the outer end portion in the tire radial direction being within the range of 25% or more and 60% or less of the tire cross-sectional height.

In the run-flat tire, preferably, in a meridian cross-section, a total of the cross-sectional area of the first bead filler rubber and the cross-sectional area of the second bead filler rubber is within the range of 25% or more and 45% or less of a cross-sectional area of the side reinforcing rubber.

In the run-flat tire, preferably, a total thickness of a thickness of the first bead filler rubber and a thickness of the second bead filler rubber at a position in the tire radial direction of the rim check line is within the range of 200% or more and 300% or less of a thickness of the side reinforcing rubber at a position in the tire radial direction of the rim check line.

In the run-flat tire, preferably, the tread portion includes a belt layer toward the outside of the carcass layer in the tire radial direction, and the belt layer includes a plurality of belt plies layered one on another, among the plurality of belt plies, a belt ply positioned the most toward the outside in the tire radial direction has a width in the tire lateral direction being within the range of 101% or more and 110% or less of a ground contact width, and among the plurality of belt plies, a belt ply having a maximum width has an overlapping amount with the side reinforcing rubber being within the range of 15 mm or more and 30 mm or less.

In the run-flat tire, preferably, at least a portion of the plurality of belt plies has an inclination angle of a belt code in the tire lateral direction with respect to the tire circumferential direction being within the range of 25° or more and 35° or less, and a belt cover is provided toward the outside of the belt layer in the tire radial direction, and is disposed at least in the range in which the belt plies are disposed in the tire lateral direction.

In the run-flat tire, preferably, the side reinforcing rubber has a tan δ at 60° C. being within the range of 0.01 or more and 0.08 or less and has a JIS-A hardness at 20° C. being within the range of 72 or more and 82 or less, and at least one of the first bead filler rubber or the second bead filler rubber has a tan δ at 60° C. being within the range of 0.01 or more and 0.08 or less and has a JIS-A hardness at 20° C. being within the range of 67 or more and 77 or less.

In the run-flat tire, preferably, the side reinforcing rubber has a tan δ at 60° C. being within the range of 0.01 or more and 0.08 or less and has a JIS-A hardness at 20° C. being within the range of 72 or more and 82 or less, and the first bead filler rubber and the second bead filler rubber each have a tan δ at 60° C. being within the range of 0.01 or more and 0.08 or less and have a JIS-A hardness at 20° C. being within the range of 67 or more and 77 or less.

A run-flat tire according to an embodiment of the present technology exerts an effect of being capable of providing improved durability during run-flat travel.

BRIEF DESCRIPTION OF DRAWINGS

FIG. 4A is a table showing the results of a performance evaluation test of run-flat tires.

FIG. 4B is a table showing the results of a performance evaluation test of run-flat tires.

DETAILED DESCRIPTION

With reference to the drawings, a detailed description will be given below on a run-flat tire according to an embodiment of the present technology. Note that an embodiment of the present technology is not limited to this embodiment. Additionally, constituents in the following embodiments include constituents that can be substituted and easily conceived by one skilled in the art, or that are substantially identical.

Embodiments

Figure 1:
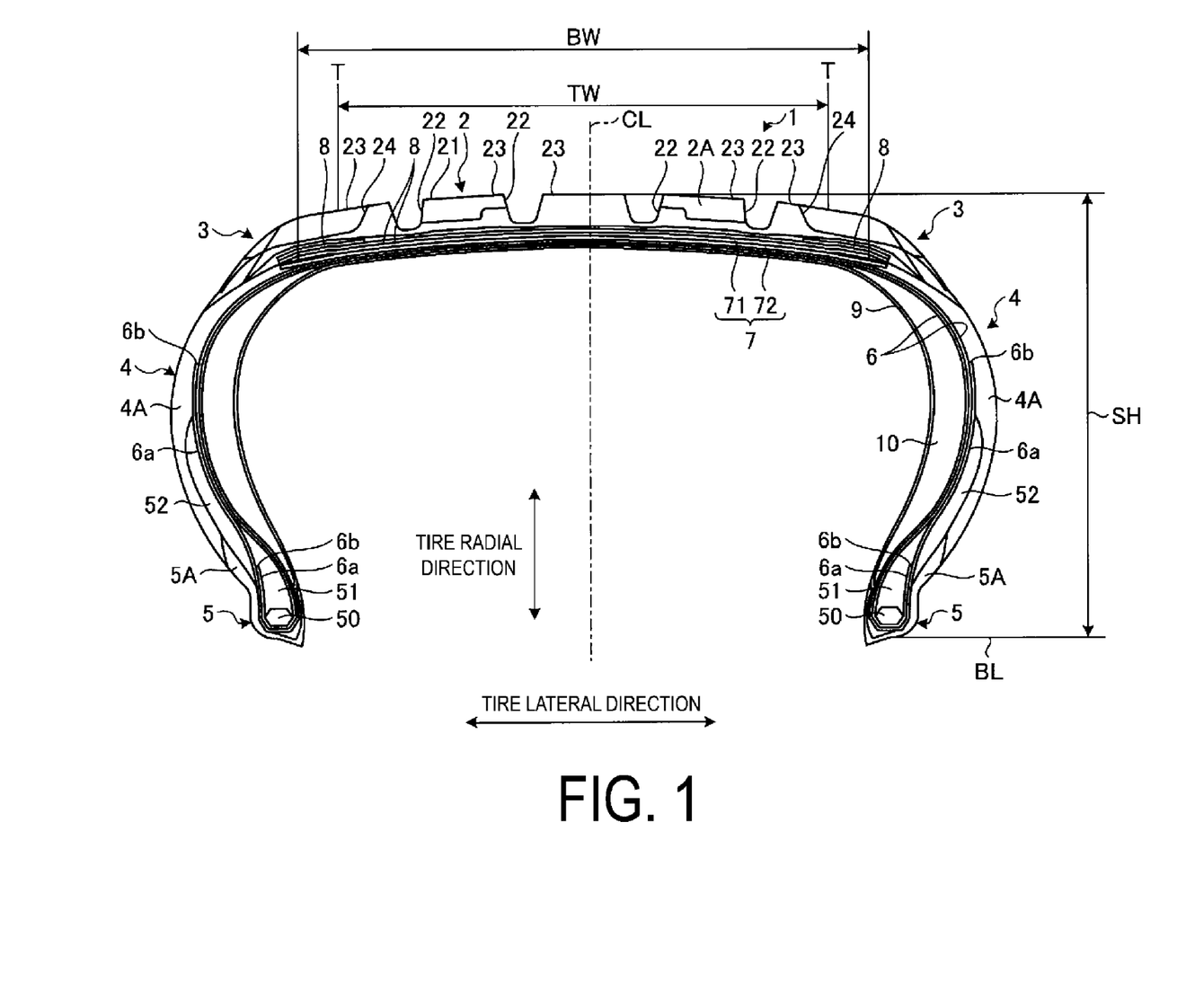
FIG. 1 is a meridian cross-sectional view of a run-flat tire according to the present embodiment.
Figure 2:
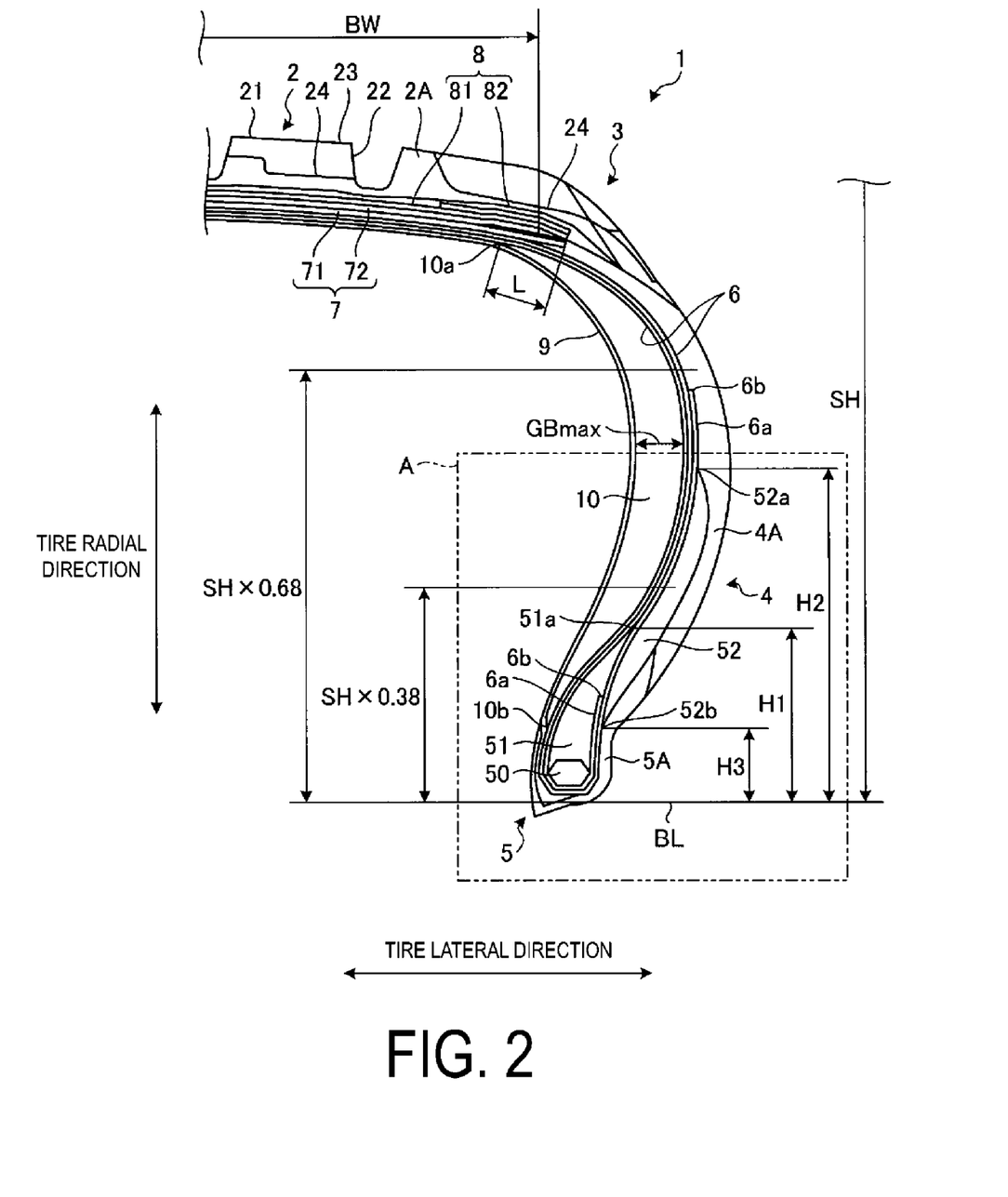
FIG. 2 is an enlarged meridian cross-sectional view of a portion of the run-flat tire according to the present embodiment.

FIG. 1 is a meridian cross-sectional view of a run-flat tire 1 according to the present embodiment. FIG. 2 is an enlarged meridian cross-sectional view of a portion of the run-flat tire 1 according to the present embodiment. In the following description, "tire radial direction" refers to the direction orthogonal to a tire rotation axis (not illustrated) of the run-flat tire 1 constituted as a pneumatic tire. "Toward the inside in the tire radial direction" refers to the direction toward the tire rotation axis in the tire radial direction. "Toward the outside in the tire radial direction" refers to the direction away from the tire rotation axis in the tire radial direction. Additionally, "tire circumferential direction" refers to the circumferential direction with the tire rotation axis as a center axis. Additionally, "tire lateral direction" refers to the direction parallel to the tire rotation axis. "Toward the inside in the tire lateral direction" refers to the direction toward a tire equatorial plane (tire equator line) CL in the tire lateral direction. "Toward the outside in the tire lateral direction" refers to the direction away from the tire equatorial plane CL in the tire lateral direction. "Tire equatorial plane CL" is a plane orthogonal to the tire rotation axis of the run-flat tire 1 and also passing through the center of the tire width of the run-flat tire 1. "Tire width" is the width in the tire lateral direction between portions positioned the most toward the outside in the tire lateral direction, that is, the distance between portions that are the most distant from the tire equatorial plane CL in the tire lateral direction. "Tire equator line" refers to a line extending along the tire circumferential direction of the run-flat tire 1 and lying on the tire equatorial plane CL. In the present embodiment, the tire equator line is denoted by the same reference sign "CL" as the reference sign of the tire equatorial plane.

As illustrated in FIG. 1, the run-flat tire 1 according to the present embodiment includes a tread portion 2, a shoulder portion 3 positioned on each of both sides in the tire lateral direction of the tread portion 2, and a sidewall portion 4 and a bead portion 5 continuous from the shoulder portion 3 in order. Additionally, the run-flat tire 1 includes a carcass layer 6, a belt layer 7, a belt cover 8, an innerliner layer 9, and a side reinforcing rubber 10.

The tread portion 2 includes a tread rubber 2A being a rubber member, and is exposed the most toward the outside of the run-flat tire 1 in the tire radial direction. Accordingly, a surface of the tread portion 2 constitutes a portion of a contour of the run-flat tire 1. A tread surface 21 is formed in an outer circumferential surface of the tread portion 2, that is, in a road contact surface that comes into contact with a road surface during travel. The tread surface 21 is provided with a plurality (four in the present embodiment) of main grooves 22 that are straight main grooves extending along the tire circumferential direction and being parallel with the tire equator line CL. Additionally, in the tread surface 21, a plurality of land portions 23 extending along the tire circumferential direction are formed with the plurality of main grooves 22. Note that the main grooves 22 may be formed bending or curving in the tire lateral direction while extending along the tire circumferential direction.

Additionally, in the tread portion 2, lug grooves 24 extending in the direction intersecting the tire circumferential direction are provided in the land portions 23 in the tread surface 21. The lug grooves 24 may communicate with the main grooves 22. Alternatively, the lug grooves 24 may include at least one end that does not communicate with the main grooves 22 and that terminates within the land portions 23. In a case where both ends of the lug grooves 24 communicate with the main grooves 22, the land portions 23 are formed into a plurality of blocks divided by the main grooves 22 and the lug grooves 24 in the tire lateral direction and the tire circumferential direction. Note that the lug grooves 24 may be inclined in the tire circumferential direction while extending in the tire lateral direction, or may be formed bending or curving in the tire circumferential direction while extending in the tire lateral direction.

The shoulder portion 3 is a site located on each of both sides toward the outside of the tread portion 2 in the tire lateral direction, and includes the tread rubber 2A being a rubber material constituting the tread portion 2. Additionally, the sidewall portion 4 is disposed on each of both sides of the tread portion 2 in the tire lateral direction, and is formed extending toward the inside from the shoulder portion 3 in the tire radial direction. The sidewall portion 4 thus formed is a portion exposed the most toward the outside of the run-flat tire 1 in the tire lateral direction, and includes a side rubber 4A being a rubber material. The side rubber 4A has a tan δ at 60° C. being within the range of 0.01 or more and 0.20 or less, and has a JIS (Japanese Industrial Standard)-A hardness at 20° C. being within the range of 50 or more and 60 or less.

Note that the tan δ in this case is obtained by measurement at a frequency of 20 Hz, an initial strain of 10%, a dynamic strain of ±2%, and a temperature of 60° C. according to JIS-K6394 with a viscoelastic spectrometer (available from Toyo Seiki Seisaku-sho, Ltd.). Additionally, JIS-A hardness is a durometer hardness obtained by measurement at a temperature of 20° C. according to JIS K-6253 with a type A durometer.

Additionally, the bead portion 5 is disposed toward the inside of the sidewall portion 4 in the tire radial direction. The bead portion 5 includes a bead core 50, first bead filler rubber 51, and second bead filler rubber 52. Of those, the bead core 50 is formed by winding a bead wire being a steel wire into a ring shape. The first bead filler rubber 51 and the second bead filler rubber 52 are rubber members disposed along the carcass layer 6. Additionally, at least one of the first bead filler rubber 51 or the second bead filler rubber 52 has a tan δ at 60° C. being within the range of 0.01 or more and 0.08 or less, and has a JIS-A hardness at 20° C. being within the range of 67 or more and 77 or less.

The carcass layer 6 extends from the tread portion 2 through the sidewall portion 4 to the bead portion 5, and includes an end portion folded back in the bead portion 5 toward the outside in the tire lateral direction while the carcass layer 6 is wound in the tire circumferential direction. Specifically, in the end portion of the carcass layer 6 in the tire lateral direction, a folded back portion 6a is formed, and the folded back portion 6a passes from an inside of each of a pair of the bead cores 50 in the tire lateral direction to an inside of the bead core 50 in the tire radial direction and is folded back toward the outside of the bead core 50 in the tire lateral direction. The carcass layer 6 thus formed is wound in a toroidal shape in the tire circumferential direction, and constitutes a backbone of the tire. Additionally, the carcass layer 6 is constituted by performing a rolling process on a coating rubber-covered carcass cord made of steel or organic fiber such as polyester, rayon, and nylon. The carcass code of the carcass layer 6 extends along the tire meridian direction, and is provided at an inclination angle with respect to the tire circumferential direction being within the predetermined range. At least one carcass layer 6 is provided, and in the present embodiment, two carcass layers 6 are provided. The two carcass layers 6 include the folded back portions 6a that differ in length in the tire radial direction.

The first bead filler rubber 51 constituting the bead portion 5 is disposed toward the outside of the bead core 50 in the tire radial direction and toward the inside of the folded back portion 6a of the carcass layer 6 in the tire lateral direction. In other words, the first bead filler rubber 51 is disposed together with the bead core 50 toward the inside of a portion where the folded back portion 6a of the carcass layer 6 is folded back, or is disposed together with the bead core 50 inside a portion surrounded by the carcass layer 6 in a portion where the folded back portion 6a is formed.

Additionally, the second bead filler rubber 52 constituting the bead portion 5 is disposed toward the outside of the folded back portion 6a of the carcass layer 6 in the tire lateral direction along the carcass layer 6. An outer end portion 52a in the tire radial direction of the second bead filler rubber 52 is positioned further toward the outside than an outer end portion 51a in the tire radial direction of the first bead filler rubber 51 in the tire radial direction. An inner end portion 52b in the tire radial direction of the second bead filler rubber 52 is positioned further toward the inside than the outer end portion 51a of the first bead filler rubber 51 in the tire radial direction.

Of the folded back portions 6a of the two carcass layers 6, the folded back portion 6a positioned toward the outside in a tire width direction includes an end portion 6b in the tire radial direction positioned further toward the outside than the first bead filler rubber 51 in the tire radial direction. This folded back portion 6a is provided to entirely cover the first bead filler rubber 51 and extend to the sidewall portion 4. On the other hand, of the folded back portions 6a of the two carcass layers 6, the folded back portion 6a positioned toward the inside in the tire width direction includes an end portion 6b in the tire radial direction positioned within the range in which the first bead filler rubber 51 in the tire radial direction is provided. Accordingly, this folded back portion 6a is provided to partially cover the first bead filler rubber 51.

Additionally, the bead portion 5 includes rim cushion rubber 5A exposed on a tire outside portion that comes into contact with a rim (not illustrated). The rim cushion rubber 5A constitutes an outer circumference of the bead portion 5, and extends from an inside of the bead portion 5 in the tire lateral direction to an inside in the tire radial direction that comes into contact with the rim and the rim cushion rubber 5A that partially cover an inner portion in the tire radial direction of the second bead filler rubber 52 disposed toward the outside of the carcass layer 6 in the tire lateral direction, and is provided reaching an inner end in the tire radial direction of the side rubber 4A of the sidewall portion 4. Note that a predetermined region of the side rubber 4A of the sidewall portion 4 that extends toward the outside in the tire radial direction from an inner end portion in the tire radial direction covers a predetermined region extending toward the inside in the tire radial direction from an outer end portion in the tire radial direction of the second bead filler rubber 52.

The belt layer 7 is constituted by layering a plurality of belt plies 71 and 72 in the tire radial direction, and is disposed toward the outside of the carcass layer 6 in the tire radial direction to be wound about an outer circumference of the carcass layer 6. In the present embodiment, the belt layer 7 includes two belt plies 71 and 72. The two belt plies 71 and 72 are constituted by performing a rolling process on a plurality of coating rubber-covered belt codes made of steel or an organic fiber material. The two belt plies 71 and 72 each have a belt angle being an inclination angle in the extension direction of the belt codes in the tire lateral direction with respect to the tire circumferential direction being within the range of 25° or more and 35° or less. Additionally, the two belt plies 71 and 72 have the belt angles having signs opposite to each other, and include a so-called crossply structure in which the two belt plies 71 and 72 are layered one on another with the extension directions of the belt codes intersecting each other. Namely, the two belt plies 71 and 72 have the inclination directions of the belt codes in the tire lateral direction with respect to the tire circumferential direction that are opposite to each other.

Of the two belt plies 71 and 72, the belt ply 71 positioned toward the inside in the tire radial direction is a first belt 71, and the belt ply 72 positioned toward the outside in the tire radial direction is a second belt 72. In this case, the second belt 72 has a width BW in the tire lateral direction being within the range of 101% or more and 110% or less of a ground contact width TW. The ground contact width TW in this case is an interval in the tire lateral direction between ground contact edges T of the tread surface 21. Additionally, the ground contact edges T refer to both outermost edges in the tire lateral direction of a region coming into contact with a flat plate in the tread surface 21, when the run-flat tire 1 is mounted on a regular rim, inflated to an internal pressure of 230 kPa, and is placed vertically with respect to the flat place in a static state, and a load corresponding to 75% of a regular load is applied. The ground contact edges T are continuous in the tire circumferential direction.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "regular load" refers to "maximum load capacity" defined by JATMA, a maximum value in "TIRE LOAD LIMITS AT VARIOUS COLD INFLATION PRESSURES" defined by TRA, or "LOAD CAPACITY" defined by ETRTO.

The belt cover layer 8 is disposed toward the outside of the belt layer 7 in the tire radial direction. The belt cover 8 is constituted by performing a rolling process on a plurality of coating rubber-covered cords made of steel or an organic fiber material. The belt cover 8 has a belt angle in the tire lateral direction with respect to the tire circumferential direction being within the range of ±5°. Additionally, the belt cover 8 is disposed toward the outside of the belt layer 7 in the tire radial direction, and is layered on the belt plies 71 and 72, and the belt cover 8 is disposed at least in the range in which the belt plies 71 and 72 of the belt layer 7 are disposed in the tire lateral direction.

In the present embodiment, the belt cover 8 includes a belt full cover 81 that entirely covers the belt layer 7 and a belt edge cover 82 that covers an end portion in the tire lateral direction of the belt layer 7. Of those, for example, the belt edge cover 82 is provided by winding in the tire circumferential direction a band-like strip material having a width of approximately 10 mm. The configuration of the belt cover 8 is not limited to the configuration described above. For example, only the belt full cover 81 may be disposed, only the belt edge cover 82 may be disposed, or a plurality of the belt full covers 81 or a plurality of the belt edge covers 82 may be disposed.

The innerliner layer 9 is an air penetration preventing layer disposed in a tire inner surface and covering the carcass layer 6, and prevents leakage of air inside the run-flat tire 1. Additionally, the innerliner layer 9 suppresses oxidation due to exposure of the carcass layer 6. Specifically, the innerliner layer 9 is disposed in an inner circumferential surface of the carcass layer 6, and also includes both end portions in the tire lateral direction that reach positions of the bead cores 50 of the pair of bead portions 5, and the innerliner layer 9 is disposed being wound in a toroidal shape in the tire circumferential direction. Note that, in the present embodiment, the innerliner layer 9 is provided extending toward the inside of the bead core 50 in the tire radial direction; however, the innerliner layer 9 may be provided extending to a position on the inside of the bead portion 5 of the tire.

The side reinforcing rubber 10 is a rubber member disposed inside the sidewall portion 4, and is disposed without being exposed to the tire inner surface or a tire outer surface. Specifically, the side reinforcing rubber 10 is mainly positioned toward the inside of a portion positioned in the sidewall portion 4 in the carcass layer 6 in the tire lateral direction, and is disposed between the carcass layer 6 and the innerliner layer 9 in the sidewall portion 4, and a shape of the side reinforcing rubber 10 in a meridian cross-section of the run-flat tire 1 is formed into a crescent shape projecting outward in the tire lateral direction.

The side reinforcing rubber 10 formed into a crescent shape includes an outer end portion 10a being an outer end portion in the tire radial direction, and the outer end portion 10a is positioned toward the inside of the belt layer 7 in the tread portion 2 in the tire radial direction. The side reinforcing rubber 10 and the belt layer 7 are disposed partially overlapping each other in the tire radial direction by an overlapping amount L being within the predetermined range. Specifically, among the plurality of belt plies 71 and 72 constituting the belt layer 7, the first belt 71 positioned toward the inside in the tire radial direction and having the maximum width in the tire lateral direction of the belt layer 7 overlaps the side reinforcing rubber 10 by the overlapping amount L being within the range of 15 mm or more and 30 mm or less.

Additionally, an inner end portion 10b being an inner end portion in the tire radial direction of the side reinforcing rubber 10 is positioned further toward the outside than a position in the tire radial direction of the bead core 50 in the bead portion 5 in the tire radial direction, and is positioned further toward the inside than the outer end portion 51a of the first bead filler rubber 51 in the tire radial direction. Additionally, the inner end portion 10b of the side reinforcing rubber 10 is positioned at substantially the same position in the tire radial direction as the position of the inner end portion 52b of the second bead filler rubber 52, or is positioned slightly further toward the inside than the inner end portion 52b of the second bead filler rubber 52 in the tire radial direction.

The side reinforcing rubber 10 formed into a crescent shape in a meridian cross-section of the run-flat tire 1 has a maximum thickness GBmax at a position toward the outside in the tire radial direction within the range of 45% or more and 60% or less of a tire cross-sectional height SH from a reference position toward the inside of the tire cross-sectional height SH in the tire radial direction. Additionally, the maximum thickness GBmax of the side reinforcing rubber 10 is within the range of 8.0 mm or more and 12.0 mm or less.

Note that the tire cross-sectional height SH in this case is a distance in the tire radial direction between a portion positioned the most toward the outside of the tread portion 2 in the tire radial direction and a rim base line BL. Herein, the rim base line BL is a tire axial direction line passing through a rim diameter defined by JATMA (Japan Automobile Tyre Manufacturers Association, Inc.).

That is, the tire cross-sectional height SH refers to one-half of a difference between a tire outer diameter and a rim diameter when the run-flat tire 1 is mounted on a regular rim and inflated to a regular internal pressure in an unloaded state where a load is not applied to the run-flat tire 1. Herein, "regular internal pressure" refers to a "maximum air pressure defined by JATMA, a maximum value in "TIRE LOAD LIMITS AT VARIOUS COLD INFLATION PRESSURES" defined by TRA (The Tire and Rim Association, Inc.), or "INFLATION PRESSURES" defined by ETRTO (European Tire and Rim Technical Organization). The tire cross-sectional height SH is thus defined, and thus the rim base line BL is a reference position toward the inside of the tire cross-sectional height SH in the tire radial direction. The run-flat tire 1 according to the present embodiment has a relatively high aspect ratio, and has the tire cross-sectional height SH of 125 mm or more. The tire cross-sectional height SH is preferably 125 mm or more and 160 mm or less.

Additionally, the side reinforcing rubber 10 has a thickness at a position toward the outside from the rim base line BL in the tire radial direction within the range of 38% or more and 68% or less of the tire cross-sectional height SH being within the range of 90% or more and 100% or less of the maximum thickness GBmax of the side reinforcing rubber 10. That is, the thickness of the side reinforcing rubber 10 at any position toward the outside from the rim base line BL in the tire radial direction within the range of 38% or more and 68% or less of the tire cross-sectional height SH is within the range of 90% or more and 100% or less of the maximum thickness GBmax. In other words, the thickness of the side reinforcing rubber 10 at a position toward the outside from the rim base line BL in the tire radial direction within the range of 38% or more and 68% or less of the tire cross-sectional height SH is 90% or more of the maximum thickness GBmax even in a portion having the smallest thickness.

Note that, the thickness of the side reinforcing rubber 10 at a position toward the outside from the rim base line BL in the tire radial direction within the range of 38% or more and 68% or less of the tire cross-sectional height SH is preferably within the range of 93% or more and 100% or less of the maximum thickness GBmax. Additionally, the side reinforcing rubber 10 has a thickness at a position within the range of ±5% of the tire cross-sectional height SH in the tire radial direction from a position in the tire radial direction of a portion having the maximum thickness GBmax preferably being within the range of 95% or more and 100% or less of the maximum thickness GBmax.

The side reinforcing rubber 10 thus provided is formed of a rubber material having strength greater than the strength of the side rubber 4A forming the sidewall portion 4 or the strength of the rim cushion rubber 5A forming the bead portion 5. Specifically, the side reinforcing rubber 10 has a tan δ at 60° C. being within the range of 0.01 or more and 0.08 or less, and has a JIS-A hardness at 20° C. being within the range of 72 or more and 82 or less. Additionally, the rim cushion rubber 5A has a tan δ at 60° C. being within the range of 0.10 or more and 0.30 or less, and has a JIS-A hardness at 20° C. being within the range of 68 or more and 78 or less. Note that the side reinforcing rubber 10 may be formed of a plurality of types of rubber, and may be formed of, for example, a plurality of types of rubber that differ in terms of tan δ at 60° C. or JIS-A hardness at 20° C.

Figure 3:
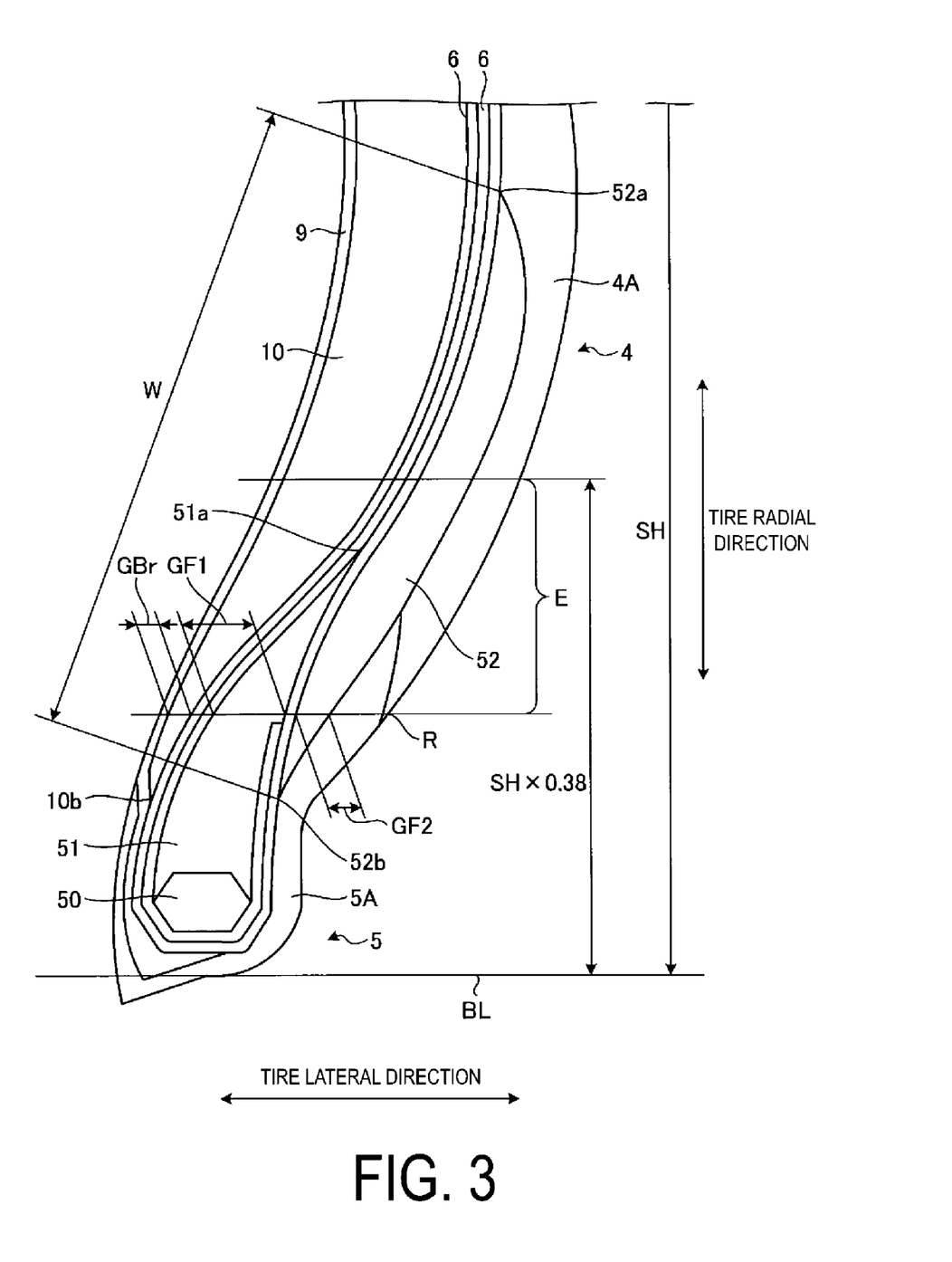
FIG. 3 is a detailed view of portion A of FIG. 2.

FIG. 3 is a detailed view of portion A of FIG. 2. At least in the range E between a position in the tire radial direction of a rim check line R and a position being 38% of the tire cross-sectional height SH toward the outside from the rim base line BL in the tire radial direction, a total thickness of the side reinforcing rubber 10, the first bead filler rubber 51, and the second bead filler rubber 52 is within the range of 100% or more and 140% or less of the maximum thickness GBmax of the side reinforcing rubber 10. Further, a total thickness of a thickness GF1 of the first bead filler rubber 51 and a thickness GF2 of the second bead filler rubber 52 at a position in the tire radial direction of the rim check line R is within the range of 200% or more and 300% or less of a thickness GBr of the side reinforcing rubber 10 at the position in the tire radial direction of the rim check line R.

Further, the first bead filler rubber 51 and the second bead filler rubber 52 are disposed at the height in the tire radial direction being within the predetermined range with respect to the tire cross-sectional height SH. Specifically, the first bead filler rubber 51 has a height H1 in the tire radial direction from the rim base line BL to the outer end portion 51a being within the range of 15% or more and 35% or less of the tire cross-sectional height SH. Additionally, the second bead filler rubber 52 has a height H2 in the tire radial direction from the rim base line BL to the outer end portion 52a being within the range of 38% or more and 65% or less of the tire cross-sectional height SH, and has a height H3 in the tire radial direction from the rim base line BL to the inner end portion 52b being within the range of 10% or more and 30% or less of the tire cross-sectional height SH. Additionally, the inner end portion 52b of the second bead filler rubber 52 has the height H3 smaller than the height H1 of the outer end portion 51a of the first bead filler rubber 51.

Note that the height H1 of the outer end portion 51a of the first bead filler rubber 51 is preferably within the range of 20% or more and 35% or less of the tire cross-sectional height SH, and the height H2 of the outer end portion 52a of the second bead filler rubber 52 is preferably within the range of 45% or more and 65% or less of the tire cross-sectional height SH.

The outer end portion 52a of the second bead filler rubber 52 has the height H2 larger than the height H1 of the outer end portion 51a of the first bead filler rubber 51, and thus the second bead filler rubber 52 is provided extending further toward the outside than the first bead filler rubber 51 in the tire radial direction. Specifically, a length in the tire radial direction of a portion of the second bead filler rubber 52 provided further toward the outside than the first bead filler rubber 51 in the tire radial direction, that is, a difference between the height H2 of the outer end portion 52a of the second bead filler rubber 52 and the height H1 of the outer end portion 51a of the first bead filler rubber 51 is within the range of 5 mm or more and 80 mm or less.

Additionally, the second bead filler rubber 52 includes the outer end portion 52a positioned further toward the outside than the outer end portion 51a in the tire radial direction of the first bead filler rubber 51 in the tire radial direction, and the inner end portion 52b positioned further toward the inside than the outer end portion 51a of the first bead filler rubber 51 in the tire radial direction. Thus, the first bead filler rubber 51 and the second bead filler rubber 52 are disposed partially overlapping each other in the tire lateral direction. An overlapping amount of the first bead filler rubber 51 and the second bead filler rubber 52 thus disposed overlapping each other, that is, a difference between the height H1 of the outer end portion 51a of the first bead filler rubber 51 and the height H3 of the inner end portion 52b of the second bead filler rubber 52 is within the range of 5 mm or more and 45 mm or less.

Further, the second bead filler rubber 52 thus formed has a linear distance W between the inner end portion 52b and the outer end portion 52a in a meridian cross-section of the run-flat tire 1 being within the range of 25% or more and 60% or less of the tire cross-sectional height SH.

Additionally, the first bead filler rubber 51 has a smaller thickness aching the outside from the inside in the tire radial direction. Additionally, at or near the outer end portion 52a of the second bead filler rubber 52, the thickness goes down approaching the outer end portion 52a, and at or near the inner end portion 52b of the second bead filler rubber 52, the thickness goes down approaching the inner end portion 52b. Thus, at or near the outer end portion 51a of the first bead filler rubber 51 and the inner end portion 52b of the second bead filler rubber 52, the thicknesses change in a direction opposite to each other according to a position in the tire radial direction.

That is, in a region in which the first bead filler rubber 51 and the second bead filler rubber 52 overlap each other, the first bead filler rubber 51 has a reduced thickness approaching the outside from the inside in the tire radial direction, and in contrast, the second bead filler rubber 52 has an increased thickness approaching the outside from the inside in the tire radial direction. As described above, the first bead filler rubber 51 and the second bead filler rubber 52 that differ in the way of change of the thickness have the same thickness at a position within the range of 10% or more and 28% or less of the height in the tire radial direction of the first bead filler rubber 51 extending the outside from the inner end portion in the tire radial direction of the first bead filler rubber 51 in the tire radial direction. At a position further toward the outside than that position in the tire radial direction, the first bead filler rubber 51 has the thickness larger than the thickness of the second bead filler rubber 52.

Additionally, the maximum thickness of the second bead filler rubber 52 having the thickness changing according to a position in the tire radial direction is within the range of 2.5 mm or more and 8 mm or less.

The first bead filler rubber 51 and the second bead filler rubber 52 are thus disposed, and in a meridian cross-section of the run-flat tire 1, a cross-sectional area of the first bead filler rubber 51 is larger than a cross-sectional area of the second bead filler rubber 52. Further, in a meridian cross-section of the run-flat tire 1, a total of the cross-sectional area of the first bead filler rubber 51 and the cross-sectional area of the second bead filler rubber 52 is within the range of 25% or more and 45% or less of cross-sectional area of the side reinforcing rubber 10.

When the run-flat tire 1 according to the present embodiment is mounted on a vehicle, the run-flat tire 1 is mounted on a rim wheel by fitting a rim wheel to the bead portion 5, and is inflated with air, and the run-flat tire 1 is mounted on a vehicle in a state where the run-flat tire 1 is inflated. When the vehicle on which the run-flat tire 1 is mounted travels, the run-flat tire 1 rotates while a portion of the tread surface 21 positioned below comes into contact with a road surface. The vehicle travels by using frictional force between the tread surface 21 and the road surface to transmit a driving force and a braking force to the road surface, and to generate a turning force. For example, when a driving force is transmitted to the road surface, the power generated by a generator, such as an engine provided in the vehicle, is transmitted to the rim wheel, and is transmitted from the rim wheel to the bead portion 5, and then to the run-flat tire 1.

In use of the run-flat tire 1, loads in various directions act on the portions as described above, and an internal air pressure, the carcass layer 6 provided as a backbone of the run-flat tire 1, and the like bear those loads. For example, the air pressure inside the run-flat tire 1, or the sidewall portions 4 and the like deflected mainly bear a load acting in the tire radial direction between the tread portion 2 and the bead portions 5 due to a weight of the vehicle or irregularities of the road surface d. That is, air inside the run-flat tire 1 acts as a force to stretch the run-flat tire 1 toward the outside from the inside. During travel of the vehicle, as described above, the run-flat tire 1 travels while bearing a large load caused by a biasing force acting toward the outside from the inside due to the air inside, or travels while the sidewall portions 4 and the like appropriately deflect. Accordingly, the vehicle can travel while riding comfort is ensured.

Here, air inside the run-flat tire 1 may escape due to a puncture caused by, for example, a foreign object puncturing the tread surface 21. When air escapes from the inside, the air pressure goes down, and a biasing force due to the air acting toward the outside from the inside of the run-flat tire 1 goes down. Thus, it becomes difficult for internal air pressure to bear a load during vehicle travel. In this case, in the run-flat tire 1 according to the present embodiment, the side reinforcing rubber 10 provided in the sidewall portion 4 can bear a portion of the load that becomes difficult for the internal air pressure to bear. That is, the side reinforcing rubber 10 is formed of a rubber material having a strength greater than the strength of the side rubber 4A forming the sidewall portion 4. Thus, even when a large load in the tire radial direction acts on the sidewall portion 4, the side reinforcing rubber 10 can suppress deformation in the tire radial direction of the sidewall portion 4.

Additionally, a portion close to the outer end portion 10a of the side reinforcing rubber 10 is disposed overlapping the belt layer 7, and the inner end portion 10b is positioned within the range in which the first bead filler rubber 51 in the tire radial direction is disposed. Thus, the side reinforcing rubber 10 can appropriately bear a load acting in the tire radial direction between the tread portion 2 and the bead portion 5, and can reduce a load acting on the side rubber 4A. Accordingly, even when the air pressure inside the run-flat tire 1 goes down, large deflection of the sidewall portion 4 due to the weight of a vehicle and the like can be suppressed, and the run-flat tire 1 can travel in a state in which air escapes from the run-flat tire 1, that is, the run-flat tire 1 can perform so-called run-flat travel.

Note that a state in which the run-flat tire 1 can perform run-flat travel is a state in which a position of each of the bead portions 5 is set to a position where the bead portion 5 is mounted on a regular rim in an unloaded state where the run-flat tire 1 is mounted on a regular rim and inflated to an internal pressure of 0 kPa or in a state equivalent to an unloaded state where the run-flat tire 1 is mounted on a regular rim and inflated to an internal pressure of 0 kPa.

The sidewall portion 4 is provided with the side reinforcing rubber 10, and thus the run-flat tire 1 according to the present embodiment can perform run-flat travel. The side reinforcing rubber 10 has a thickness at a position the outside from the rim base line BL in the tire radial direction within the range of 38% or more and 68% or less of the tire cross-sectional height SH being within the range of 90% or more and 100% or less of the maximum thickness GBmax of the side reinforcing rubber 10. Thus, the thickness of the side reinforcing rubber 10 is also ensured at a position close to the outside in the tire radial direction, namely, a position close to the tread portion 2, and rigidity at the position close to the tread portion 2 is ensured.

The run-flat tire 1 according to the present embodiment includes the first bead filler rubber 51 and the second bead filler rubber 52 that differ in physical properties from the side rubber 4A. In the range E between the position in the tire radial direction of the rim check line R and the position being 38% of the tire cross-sectional height SH the outside from the rim base line BL in the tire radial direction, the total thickness of the side reinforcing rubber 10, the first bead filler rubber 51, and the second bead filler rubber 52 is within the range of 100% or more and 140% or less of the maximum thickness GBmax of the side reinforcing rubber 10. Accordingly, at the position close to the bead portion 5, rigidity is ensured by the side reinforcing rubber 10, the first bead filler rubber 51, and the second bead filler rubber 52. Thus, rigidity is ensured entirely over a region in the tire radial direction of the sidewall portion 4 from the position close to the tread portion 2 to the position close to the bead portion 5, and large deflection of the sidewall portion 4 including portions close to both ends in the tire radial direction is suppressed during run-flat travel.

Particularly, the run-flat tire 1 according to the present embodiment has a relatively high aspect ratio, and the tire cross-sectional height SH is 125 mm or more. Thus, the sidewall portion 4 tends to easily deflect. However, rigidity is ensured entirely over the region in the tire radial direction of the sidewall portion 4. Accordingly, even in a state where the sidewall portion 4 tends to easily deflect due to the dimension, deflection of the sidewall portion 4 during run-flat travel can be suppressed. Accordingly, breakage due to the sidewall portion 4 that repeatedly deflects largely during run-flat travel can be suppressed. As a result, improved durability during run-flat travel can be provided.

Additionally, in a meridian cross-section of the run-flat tire 1, the cross-sectional area of the second bead filler rubber 52 is larger than the cross-sectional area of the first bead filler rubber 51. Thus, without excessively increasing rigidity at a position at or near the bead core 50, rigidity of the sidewall portion 4 can be ensured. Accordingly, deflection at or near a portion of the run-flat tire 1 that is mounted on a rim wheel can be allowed to some extent, and degradation of riding comfort during normal travel with air inside due to excessively high rigidity of the entirety of the sidewall portions 4 can be suppressed. As a result, improved durability during run-flat travel can be provided while ensuring ride comfort performance.

Additionally, the first bead filler rubber 51 includes the outer end portion 51a having the height H1 being within the range of 15% or more and 35% or less of the tire cross-sectional height SH, and the second bead filler rubber 52 includes the outer end portion 52a having the height H2 being within the range of 38% or more and 65% or less of the tire cross-sectional height SH. Further, the second bead filler rubber 52 has the distance W between the inner end portion 52b and the outer end portion 52a being within the range of 25% or more and 60% or less of the tire cross-sectional height SH. Thus, rigidity of the sidewall portion 4 can be ensured more reliably while excessively high rigidity of the range from the sidewall portion 4 to the bead portion 5 is suppressed.

That is, when the outer end portion 51a of the first bead filler rubber 51 has the height H1 of less than 15% of the tire cross-sectional height SH, the outer end portion 52a of the second bead filler rubber 52 has the height H2 of less than 38% of the tire cross-sectional height SH, or the distance W between the inner end portion 52b and the outer end portion 52a of the second bead filler rubber 52 is less than 25% of the tire cross-sectional height SH, an effect of ensuring rigidity of the sidewall portion 4 tends to be difficult to obtain. Namely, rigidity of the sidewall portion 4 required for enabling run-flat travel is achieved by the first bead filler rubber 51 and the second bead filler rubber 52 in addition to the side reinforcing rubber 10. When the height H1 of the outer end portion 51a of the first bead filler rubber 51, the height H2 of the outer end portion 52a of the second bead filler rubber 52, and the distance W between the inner end portion 52b and the outer end portion 52a of the second bead filler rubber 52 are within those ranges, the range in which the first bead filler rubber 51 and the second bead filler rubber 52 are disposed in the tire radial direction is excessively small, and thus rigidity of the sidewall portion 4 tends to be difficult to ensure. Additionally, when the first bead filler rubber 51 includes the outer end portion 51a having the height H1 of more than 35% of the tire cross-sectional height SH, the second bead filler rubber 52 includes the outer end portion 52a having the height H2 of more than 65% of the tire cross-sectional height SH, or the distance W between the inner end portion 52b and the outer end portion 52a of the second bead filler rubber 52 is more than 60% of the tire cross-sectional height SH, rigidity of the range from the sidewall portion 4 to the bead portion 5 tends to be excessively high. Additionally, in this case, a rubber amount is excessive, and run-flat durability tends to easily reduce due to heat generation of rubber.

In contrast, when the first bead filler rubber 51 includes the outer end portion 51a having the height H1 being within the range of 15% or more and 35% or less of the tire cross-sectional height SH, the second bead filler rubber 52 includes the outer end portion 52a having the height H2 being within the range of 38% or more and 65% or less of the tire cross-sectional height SH, and the distance W between the inner end portion 52b and the outer end portion 52a of the second bead filler rubber 52 is within the range of 25% or more and 60% or less of the tire cross-sectional height SH, rigidity of the sidewall portion 4 can be ensured more reliably while suppressing excessively high rigidity of the range from the sidewall portion 4 to the bead portion 5 and suppressing heat generation due to an excessive rubber amount. Accordingly, breakage due to the sidewall portions 4 that repeatedly deflect largely during run-flat travel can be suppressed while more reliably allowing deflection at or near the bead portion 5 to some extent. As a result, improved durability during run-flat travel can be provided while more reliably ensuring ride comfort performance.

Additionally, in a meridian cross-section of the run-flat tire 1, the total of the cross-sectional area of the first bead filler rubber 51 and the cross-sectional area of the second bead filler rubber 52 is within the range of 25% or more and 45% or less of the cross-sectional area of the side reinforcing rubber 10. Thus, rigidity of the sidewall portion 4 can be ensured more reliably while suppressing excessively high rigidity of the range from the sidewall portion 4 to the bead portion 5. That is, when the total of the cross-sectional area of the first bead filler rubber 51 and the cross-sectional area of the second bead filler rubber 52 is less than 25% of the cross-sectional area of the side reinforcing rubber 10, the cross-sectional area of the first bead filler rubber 51 and the cross-sectional area of the second bead filler rubber 52 are excessively small. Thus, rigidity of the sidewall portion 4 tends to be difficult to ensure. Additionally, when the total of the cross-sectional area of the first bead filler rubber 51 and the cross-sectional area of the second bead filler rubber 52 is more than 45% of the cross-sectional area of the side reinforcing rubber 10, the cross-sectional area of the first bead filler rubber 51 and the cross-sectional area of the second bead filler rubber 52 are excessively large. Thus, rigidity of the range from the sidewall portion 4 to the bead portion 5 tends to be excessively high. Additionally, when the cross-sectional area of the first bead filler rubber 51 and the cross-sectional area of the second bead filler rubber 52 are excessively large, a rubber amount is excessive, and run-flat durability tends to easily reduce due to heat generation of rubber.

In contrast, when the total of the cross-sectional area of the first bead filler rubber 51 and the cross-sectional area of the second bead filler rubber 52 is within the range of 25% or more and 45% or less of the cross-sectional area of the side reinforcing rubber 10, rigidity of the sidewall portion 4 can be ensured more reliably while suppressing excessively high rigidity of the range from the sidewall portion 4 to the bead portion 5 and suppressing heat generation due to an excessive rubber amount. As a result, improved durability during run-flat travel can be provided while more reliably ensuring ride comfort performance.

Additionally, the total thickness of the thickness GF1 of the first bead filler rubber 51 and the thickness GF2 of the second bead filler rubber 52 at the position in the tire radial direction of the rim check line R is within the range of 200% or more and 300% or less of the thickness GBr of the side reinforcing rubber 10 at the position in the tire radial direction of the rim check line R. Thus, rigidity at or near the bead portion 5 required for run-flat travel can be ensured appropriately by the first bead filler rubber 51 and the second bead filler rubber 52. That is, when the total thickness of the thickness GF1 of the first bead filler rubber 51 and the thickness GF2 of the second bead filler rubber 52 at the position in the tire radial direction of the rim check line R is less than 200% of the thickness GBr of the side reinforcing rubber 10, the thickness GF1 of the first bead filler rubber 51 and the thickness GF2 of the second bead filler rubber 52 at or near the bead portion 5 are excessively small. Thus, rigidity at or near the bead portion 5 required for run-flat travel tends to be difficult to ensure by the first bead filler rubber 51 and the second bead filler rubber 52. Additionally, when the total thickness of the thickness GF1 of the first bead filler rubber 51 and the thickness GF2 of the second bead filler rubber 52 at the position in the tire radial direction of the rim check line R is more than 300% of the thickness GBr of the side reinforcing rubber 10, the thickness GF1 of the first bead filler rubber 51 and the thickness GF2 of the second bead filler rubber 52 at or near the bead portion 5 are excessively large. Thus, rigidity at or near the bead portion 5 ensured by the first bead filler rubber 51 and the second bead filler rubber 52 tends to be excessive with respect to rigidity required for run-flat travel.

In contrast, when the total thickness of the thickness GF1 of the first bead filler rubber 51 and the thickness GF2 of the second bead filler rubber 52 at the position in the tire radial direction of the rim check line R is within the range of 200% or more and 300% or less of the thickness GBr of the side reinforcing rubber 10, rigidity at or near the bead portion 5 required for run-flat travel can be ensured appropriately by the first bead filler rubber 51 and the second bead filler rubber 52. Accordingly, rigidity at or near the bead portion 5 that easily deflect largely during run-flat travel can be ensured by an appropriate magnitude, and repeated large deflection of a region at or near the bead portion 5 during run-flat travel can be suppressed more reliably. As a result, improved durability during run-flat travel can be provided more reliably.

Additionally, the width BW in the tire lateral direction of the second belt 72 of the belt layer 7 is within the range of 101% or more and 110% or less of the ground contact width TW, and the overlapping amount L between the first belt 71 that is the belt having the maximum width and the side reinforcing rubber 10 is within the range of 15 mm or more and 30 mm or less. Thus, the range where a load is transmitted between the belt layer 7 and the side reinforcing rubber 10 can be ensured while suppressing excessively large weights of the belt layer 7 and the side reinforcing rubber 10. That is, when the width BW of the second belt 72 is less than 101% of the ground contact width TW and the overlapping amount L between the first belt 71 and the side reinforcing rubber 10 is less than 15 mm, the range where a load is transmitted between the belt layer 7 and the side reinforcing rubber 10 reduces, and a large load tends to locally act on the side reinforcing rubber 10. In this case, the side reinforcing rubber 10 tends to locally repeatedly largely deform during run-flat travel. Additionally, when the width BW of the second belt 72 is more than 110% of the ground contact width TW and the overlapping amount L between the first belt 71 and the side reinforcing rubber 10 is more than 30 mm, widths in the tire lateral direction of the first belt 71 and the second belt 72 tend to be excessively large and the outer end portion 10a of the side reinforcing rubber 10 tends to excessively largely extend toward the inside in the tire radial direction. Additionally, weights of the belt layer 7 and the side reinforcing rubber 10 tend to be excessively large.

In contrast, when the width BW of the second belt 72 is within the range of 101% or more and 110% or less of the ground contact width TW and the overlapping amount L between the first belt 71 and the side reinforcing rubber 10 is within the range of 15 mm or more and 30 mm or less, the range where a load is transmitted between the belt layer 7 and the side reinforcing rubber 10 can be ensured to be the appropriate range while suppressing excessively large weights of the belt layer 7 and the side reinforcing rubber 10. Accordingly, local repeated large deflection of the side reinforcing rubber 10 during run-flat travel can be suppressed more reliably. As a result, improved durability during run-flat travel can be provided more reliably while suppressing an excessively large weight of the run-flat tire 1.

Additionally, the belt layer 7 includes the belt plies 71 and 72 each having the belt angle being within the range of 25° or more and 35° or less. Thus, buckling during run-flat travel can be suppressed, and steering stability during normal travel can also be ensured. That is, when the belt angle of each of the belt plies 71 and 72 is less than 25°, the inclination angle of the belt codes with respect to the tire circumferential direction is excessively small. Thus, it becomes difficult to ensure rigidity in the tire lateral direction of the belt layer 7, and deformation caused by lifting of a central region in the tire lateral direction of the tread portion 2 from the road surface during run-flat travel, that is, so-called buckling tends to be easily generated. Additionally, when the belt angle of each of the belt plies 71 and 72 is more than 35°, the inclination angle of the belt codes with respect to the tire circumferential direction is excessively large. Thus, rigidity in the tire circumferential direction of the belt layer 7 becomes difficult to ensure, and steering stability during normal travel with air inside tends to be difficult to ensure.

In contrast, when the belt angle of each of the belt plies 71 and 72 is within the range of 25° or more and 35° or less, rigidity in each of the tire lateral direction and the tire circumferential direction of the belt layer 7 can be ensured appropriately. Thus, buckling during run-flat travel can be suppressed, and steering stability during normal travel can also be ensured. As a result, improved durability during run-flat travel can be provided more reliably while ensuring steering stability during normal travel.

Additionally, the belt cover 8 disposed toward the outside of the belt layer 7 in the tire radial direction includes the belt full cover 81 that entirely covers the belt layer 7. Thus, rigidity in each of the tire lateral direction and the tire circumferential direction of the belt layer 7 can be ensured more reliably by the belt full cover 81. Accordingly, buckling during run-flat travel can be suppressed more reliably, and steering stability during normal travel can also be ensured. As a result, improved durability during run-flat travel can be provided while more reliably ensuring steering stability during normal travel.

Additionally, the side reinforcing rubber 10 has a tan δ at 60° C. being within the range of 0.01 or more and 0.08 or less, and has a JIS-A hardness at 20° C. being within the range of 72 or more and 82 or less. Thus, improved run-flat durability can be provided while suppressing increase in a manufacturing cost and degradation of riding comfort. That is, when the side reinforcing rubber 10 has a tan δ at 60° C. of 0.01 or more, this is advantageous in terms of productivity and a cost of a rubber composition, and when the side reinforcing rubber 10 has a tan δ at 60° C. of 0.08 or less, the side reinforcing rubber 10 can have low heat generation advantageous for run-flat durability performance. Additionally, when the side reinforcing rubber 10 has a JIS-A hardness at 20° C. of 72 or more, the side reinforcing rubber 10 can have hardness advantageous for run-flat durability performance, and when the side reinforcing rubber 10 has a JIS-A hardness at 20° C. of 82 or less, the side reinforcing rubber 10 can have softness advantageous for ride comfort performance.

Additionally, at least one of the first bead filler rubber 51 or the second bead filler rubber 52 has a tan δ at 60° C. being within the range of 0.01 or more and 0.08 or less, and has a JIS-A hardness at 20° C. being within the range of 67 or more and 77 or less. Thus, improved run-flat durability can be provided while suppressing increase in a manufacturing cost and degradation of riding comfort. That is, when at least one of the first bead filler rubber 51 or the second bead filler rubber 52 has a tan δ at 60° C. of 0.01 or more, this becomes advantageous in terms of productivity and a cost of a rubber composition, and when at least one of the first bead filler rubber 51 or the second bead filler rubber 52 has a tan δ at 60° C. of 0.08 or less, at least one of the first bead filler rubber 51 or the second bead filler rubber 52 has low heat generation advantageous for run-flat durability performance. Additionally, when at least one of the first bead filler rubber 51 or the second bead filler rubber 52 has a JIS-A hardness at 20° C. of 67 or more, at least one of the first bead filler rubber 51 or the second bead filler rubber 52 can have hardness advantageous for run-flat durability performance, and when at least one of the first bead filler rubber 51 or the second bead filler rubber 52 has a JIS-A hardness at 20° C. of 77 or less, at least one of the first bead filler rubber 51 or the second bead filler rubber 52 can have softness advantageous for ride comfort performance.

Modified Examples

Note that, in the run-flat tire 1 according to the embodiment described above, at least one of the first bead filler rubber 51 or the second bead filler rubber 52 has a tan δ at 60° C. being within the range of 0.01 or more and 0.08 or less, and has a JIS-A hardness at 20° C. being within the range of 67 or more and 77 or less; however, both the first bead filler rubber 51 and the second bead filler rubber 52 may have a tan δ at 60° C. being within the range of 0.01 or more and 0.08 or less, and may have a JIS-A hardness at 20° C. being within the range of 67 or more and 77 or less. Both the first bead filler rubber 51 and the second bead filler rubber 52 have a tan δ at 60° C. and a JIS-A hardness at 20° C. being within those ranges, and accordingly, improved run-flat durability can be provided while more reliably suppressing increase in a manufacturing cost and degradation of riding comfort.

Additionally, in the run-flat tire 1 according to the embodiment described above, the belt layer 7 is constituted by layering two layers of the first belt 71 and the second belt 72. However, the belt layer 7 may include three or more belt plies. Even in a case where the belt layer 7 includes three or more belt plies, it is only required that the width BW in the tire radial direction of the belt ply positioned the most the outside in the tire radial direction be within the range of 101% or more and 110% or less of the ground contact width TW and that the overlapping amount L between the belt ply having the maximum width and the side reinforcing rubber 10 be within the range of 15 mm or more and 30 mm or less. Even in a case where the belt layer 7 includes three or more belt plies, the belt ply positioned the most the outside in the tire radial direction and the belt ply having the maximum width are thus constituted, and accordingly, the range where a load is transmitted between the belt layer 7 and the side reinforcing rubber 10 can be ensured while suppressing excessively large weights of the belt layer 7 and the side reinforcing rubber 10. As a result, improved durability during run-flat travel can be provided more reliably while suppressing an excessively large weight of the run-flat tire 1.

Additionally, in the run-flat tire 1 according to the embodiment described above, the two carcass layers 6 are provided. However, the number of the carcass layers 6 may be other than two, and may be one. In a case where one carcass layer 6 is provided, to ensure steering stability during normal travel and run-flat durability, the folded back portion 6a preferably extends outward in the tire radial direction, and the end portion 6b of the folded back portion 6a is preferably disposed toward the inside of the belt layer 7 in the tire radial direction.

Examples

FIG. 4A and FIG. 4B are tables showing the results of a performance evaluation test of run-flat tires. Description will be made below on a performance evaluation test performed on run-flat tires of Conventional Examples, the run-flat tires 1 described above according to an embodiment of the present technology, and run-flat tires of Comparative Examples for comparison with the run-flat tires 1 according to an embodiment of the present technology. The performance evaluation test for run-flat durability performance indicating durability during run-flat travel of the run-flat tire 1 and ride comfort performance during normal travel was performed.

The performance evaluation test was performed by mounting each test tire having a nominal 235/60 RF18 specified by JATMA on a rim wheel of a JATMA standard rim having a rim size of 18×7.5 J, inflating the test tire to an air pressure of 230 kPa, and mounting the test tire on a test vehicle being a four-wheel drive passenger vehicle of 2.0 L displacement to perform test travel.

In an evaluation method of run-flat durability performance, an air pressure of a right front-wheel tire among the test tires mounted on the test vehicle was set to 0 kPa to perform travel in a test course being a dry road surface at an average speed of 80 km/h, and a travel distance until a test drive felt vibration due to tire failure during the travel was measured. The measured travel distance was expressed as an index value with Conventional Example 1 being assigned the value of 100. A greater value of run-flat durability performance indicates a longer travel distance until the test driver felt vibration, and indicates that tire failure in the case of traveling with an air pressure of 0 kPa is less likely to be generated.

Additionally, in an evaluation method of ride comfort performance, an air pressure of each of four tires was set to 230 kPa to perform travel in a test course being a dry road surface, and sensory evaluation by a test driver during the travel was performed, and was expressed as an index value with Conventional Example 1 being assigned the value of 100. A larger value of ride comfort performance indicates good ride comfort, and excellent ride comfort performance.

The performance evaluation test was performed on 18 types of run-flat tires including run-flat tires of Conventional Examples 1 and 2 that are an example of a conventional run-flat tire, Examples 1 to 13 that are the run-flat tire 1 according to an embodiment of the present technology, and Comparative Examples 1 to 3 that are run-flat tires for comparison with the run-flat tire 1 according to an embodiment of the present technology. Among those, in each of the run-flat tires of Conventional Examples 1 and 2 and Comparative Examples 1 to 3, the thickness of the side reinforcing rubber 10 at a position outward from the rim base line BL in the tire radial direction within the range of 38% or more and 68% or less of the tire cross-sectional height SH is not within the range of 90% or more and 100% or less of the maximum thickness GBmax of the side reinforcing rubber 10, or in the range E between the rim check line R and the position being 38% of the tire cross-sectional height SH from the rim base line BL, the total thickness of the side reinforcing rubber 10, the first bead filler rubber 51, and the second bead filler rubber 52 is not within the range of 100% or more and 140% or less of the maximum thickness GBmax of the side reinforcing rubber 10.

In contrast, in all Examples 1 to 13 being an example of the run-flat tire 1 according to an embodiment of the present technology, the thickness of the side reinforcing rubber 10 at a position outward from the rim base line BL in the tire radial direction within the range of 38% or more and 68% or less of the tire cross-sectional height SH is within the range of 90% or more and 100% or less of the maximum thickness GBmax of the side reinforcing rubber 10, or in the range E between the rim check line R and the position being 38% of the tire cross-sectional height SH from the rim base line BL, the total thickness of the side reinforcing rubber 10, the first bead filler rubber 51, and the second bead filler rubber 52 is within the range of 100% or more and 140% or less of the maximum thickness GBmax of the side reinforcing rubber 10. Further, the run-flat tires 1 according to Examples 1 to 13 differ from one another in the cross-sectional area of the second bead filler rubber 52 with respect to the cross-sectional area of the first bead filler rubber 51 [+ or −], the height H1 of the outer end portion 51a of the first bead filler rubber 51 with respect to the tire cross-sectional height SH [%], the height H2 of the outer end portion 52a of the second bead filler rubber 52 with respect to the tire cross-sectional height SH [%], the distance W between the inner end portion 52b and the outer end portion 52a of the second bead filler rubber 52 with respect to the tire cross-sectional height SH [%], the total cross-sectional area of the first bead filler rubber 51 and the second bead filler rubber 52 with respect to the cross-sectional area of the side reinforcing rubber 10 [%], the total thickness of the first bead filler rubber 51 and the second bead filler rubber 52 with respect to the thickness GBr of the side reinforcing rubber 10 [%] at the position of the rim check line R, the width BW of the second belt 72 with respect to the ground contact width TW [%], the overlapping amount L between the first belt 71 and the side reinforcing rubber 10 [mm], the belt angle of the belt layer 7 [°], the presence of the belt full cover 81, the JIS-A hardness at 20° C. of the side reinforcing rubber 10, the value of tan δ at 60° C. of the side reinforcing rubber 10, the JIS-A hardness at 20° C. of the first bead filler rubber 51, the value of tan δ at 60° C. of the first bead filler rubber 51, the JIS-A hardness at 20° C. of the second bead filler rubber 52, and tan δ at 60° C. of the second bead filler rubber 52.

As can be seen from the results of the evaluation test using those run-flat tires 1, as shown in FIG. 4A and FIG. 4B, the run-flat tires 1 according to Examples 1 to 13 can provide improved run-flat durability performance without reducing ride comfort performance as compared to the run-flat tires of Conventional Examples 1 and 2 and Comparative Examples 1 to 3. That is, the run-flat tires 1 according to Examples 1 to 13 can provide improved durability during run-flat travel.

The invention claimed is:

1. A run-flat tire, comprising:
   a tread portion;
   a sidewall portion disposed on each of both sides of the tread portion;
   a bead portion disposed toward the inside of the sidewall portion in a tire radial direction;
   a plurality of carcass layers extending from the tread portion through the sidewall portion to the bead portion, each comprising an end portion folded back in the bead portion toward the outside in a tire lateral direction while the carcass layers are wound in a tire circumferential direction;
   an innerliner layer disposed in an inner circumferential surface of the carcass layers;
   side reinforcing rubber disposed between the carcass layers and the innerliner layer in the sidewall portion;
   first bead filler rubber disposed toward the inside of a folded back portion of the carcass layers in the tire lateral direction; and
   second bead filler rubber disposed toward the outside of the folded back portion of the carcass layers in the tire lateral direction along the carcass layers;
   the side reinforcing rubber having a thickness from a reference position toward the inside of a tire cross-sectional height in the tire radial direction to a position toward the outside within a range of 38% or more and 68% or less of the tire cross-sectional height in the tire radial direction being within a range of 90% or more and 100% or less of a maximum thickness of the side reinforcing rubber; and
   at least in a range from a position in the tire radial direction of a rim check line to a position being 38% of the tire cross-sectional height outward from the reference position in the tire radial direction, a total thickness of the side reinforcing rubber, the first bead filler rubber, and the second bead filler rubber being within a range of 100% or more and 140% or less of the maximum thickness of the side reinforcing rubber.

2. The run-flat tire according to claim 1, wherein
   the first bead filler rubber has a height in the tire radial direction from the reference position to an outer end portion in the tire radial direction being within a range of 15% or more and 35% or less of the tire cross-sectional height,
   the second bead filler rubber has a height in the tire radial direction from the reference position to an outer end portion in the tire radial direction being within a range of 38% or more and 65% or less of the tire cross-sectional height, and
   the second bead filler rubber has a distance between an inner end portion in the tire radial direction and the outer end portion in the tire radial direction being within a range of 25% or more and 60% or less of the tire cross-sectional height.

3. The run-flat tire according to claim 1, wherein in a meridian cross-section, a total of the cross-sectional area of the first bead filler rubber and a cross-sectional area of the second bead filler rubber is within a range of 25% or more and 45% or less of a cross-sectional area of the side reinforcing rubber.

4. The run-flat tire according to claim 1, wherein a total thickness of a thickness of the first bead filler rubber and a thickness of the second bead filler rubber at a position in the tire radial direction of the rim check line is within a range of 200% or more and 300% or less of a thickness of the side reinforcing rubber at a position in the tire radial direction of the rim check line.

5. The run-flat tire according to claim 1, wherein
the side reinforcing rubber has a tan δ at 60° C. being within a range of 0.01 or more and 0.08 or less and has a JIS-A hardness at 20° C. being within a range of 72 or more and 82 or less, and
at least one of the first bead filler rubber or the second bead filler rubber has a tan δ at 60° C. being within a range of 0.01 or more and 0.08 or less and has a JIS-A hardness at 20° C. being within a range of 67 or more and 77 or less.

6. The run-flat tire according to claim 1, wherein
the side reinforcing rubber has a tan δ at 60° C. being within a range of 0.01 or more and 0.08 or less and has a JIS-A hardness at 20° C. being within a range of 72 or more and 82 or less, and
the first bead filler rubber and the second bead filler rubber each have a tan δ at 60° C. being within a range of 0.01 or more and 0.08 or less and have a JIS-A hardness at 20° C. being within a range of 67 or more and 77 or less.

7. The run-flat tire according to claim 1, wherein the end portion of a first one of the carcass layers terminates at a height less than a height of the first bead filler, and the end portion of a second one of the carcass layers extends further radially outward than the end portion of the first one of the carcass layers and sandwiches the end portion of the first one of the carcass layers between the end portion of the second one of the carcass layers and the first bead filler.

8. The run-flat tire according to claim 1, wherein
the tread portion includes a belt layer toward the outside of the carcass layers in the tire radial direction, and the belt layer includes a plurality of belt plies layered one on another,
among the plurality of belt plies, a belt ply positioned the most toward the outside in the tire radial direction has a width in the tire lateral direction being within a range of 101% or more and 110% or less of a ground contact width, and
among the plurality of belt plies, a belt ply having a maximum width has an overlapping amount with the side reinforcing rubber being within a range of 15 mm or more and 30 mm or less.

9. The run-flat tire according to claim 8, wherein
at least a portion of the plurality of belt plies has an inclination angle of a belt code in the tire lateral direction with respect to the tire circumferential direction being within a range of 25° or more and 35° or less, and
a belt cover is provided toward the outside of the belt layer in the tire radial direction, and is disposed at least in a range in which the belt plies are disposed in the tire lateral direction.

10. The run-flat tire according to claim 1, wherein in a meridian cross-section, a cross-sectional area of the first bead filler rubber is larger than a cross-sectional area of the second bead filler rubber.

11. The run-flat tire according to claim 10, wherein
the first bead filler rubber has a height in the tire radial direction from the reference position to an outer end portion in the tire radial direction being within a range of 15% or more and 35% or less of the tire cross-sectional height,
the second bead filler rubber has a height in the tire radial direction from the reference position to an outer end portion in the tire radial direction being within a range of 38% or more and 65% or less of the tire cross-sectional height, and
the second bead filler rubber has a distance between an inner end portion in the tire radial direction and the outer end portion in the tire radial direction being within a range of 25% or more and 60% or less of the tire cross-sectional height.

12. The run-flat tire according to claim 11, wherein in a meridian cross-section, a total of the cross-sectional area of the first bead filler rubber and the cross-sectional area of the second bead filler rubber is within a range of 25% or more and 45% or less of a cross-sectional area of the side reinforcing rubber.

13. The run-flat tire according to claim 12, wherein a total thickness of a thickness of the first bead filler rubber and a thickness of the second bead filler rubber at a position in the tire radial direction of the rim check line is within a range of 200% or more and 300% or less of a thickness of the side reinforcing rubber at a position in the tire radial direction of the rim check line.

14. The run-flat tire according to claim 13, wherein
the tread portion includes a belt layer toward the outside of the carcass layers in the tire radial direction, and the belt layer includes a plurality of belt plies layered one on another,
among the plurality of belt plies, a belt ply positioned the most toward the outside in the tire radial direction has a width in the tire lateral direction being within a range of 101% or more and 110% or less of a ground contact width, and
among the plurality of belt plies, a belt ply having a maximum width has an overlapping amount with the side reinforcing rubber being within a range of 15 mm or more and 30 mm or less.

15. The run-flat tire according to claim 14, wherein
at least a portion of the plurality of belt plies has an inclination angle of a belt code in the tire lateral direction with respect to the tire circumferential direction being within a range of 25° or more and 35° or less, and
a belt cover is provided toward the outside of the belt layer in the tire radial direction, and is disposed at least in a range in which the belt plies are disposed in the tire lateral direction.

16. The run-flat tire according to claim 15, wherein
the side reinforcing rubber has a tan δ at 60° C. being within a range of 0.01 or more and 0.08 or less and has a JIS-A hardness at 20° C. being within a range of 72 or more and 82 or less, and
at least one of the first bead filler rubber or the second bead filler rubber has a tan δ at 60° C. being within a range of 0.01 or more and 0.08 or less and has a JIS-A hardness at 20° C. being within a range of 67 or more and 77 or less.

17. The run-flat tire according to claim 15, wherein
the side reinforcing rubber has a tan δ at 60° C. being within a range of 0.01 or more and 0.08 or less and has a JIS-A hardness at 20° C. being within a range of 72 or more and 82 or less, and the first bead filler rubber and the second bead filler rubber each have a tan δ at 60° C. being within a range of 0.01 or more and 0.08 or less and have a JIS-A hardness at 20° C. being within a range of 67 or more and 77 or less.

* * * * *